Nov. 10, 1925.
H. M. BREWSTER
SHOCK ABSORBER
Filed May 4, 1925
1,560,655
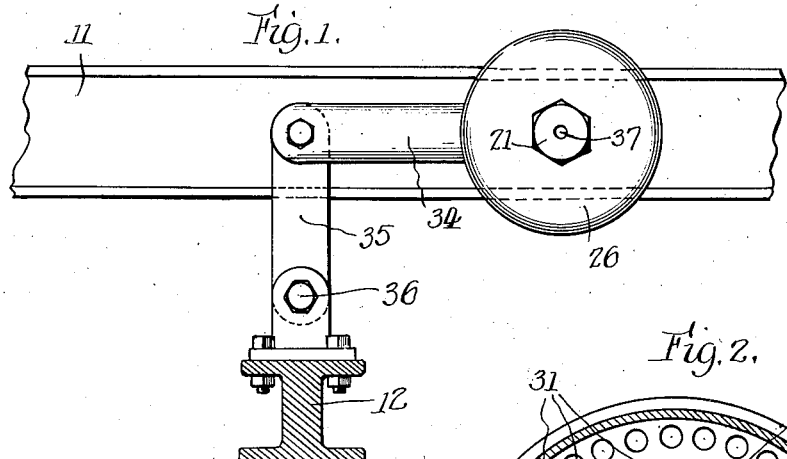
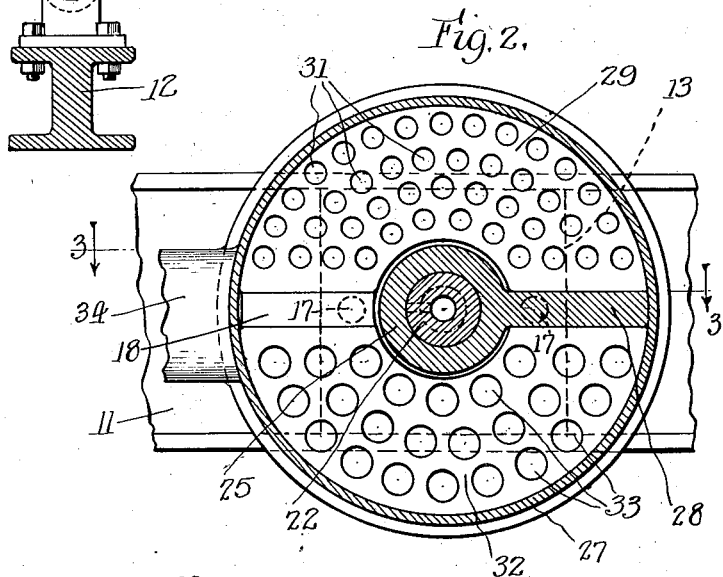
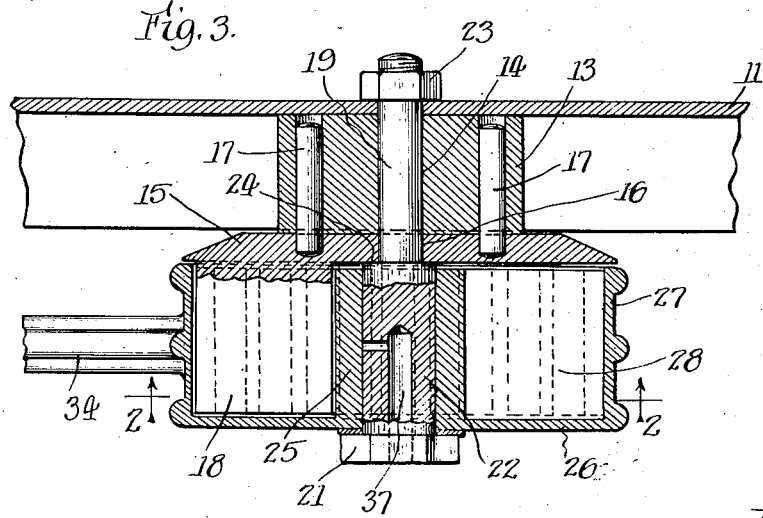

Patented Nov. 10, 1925.

1,560,655

UNITED STATES PATENT OFFICE.

HERBERT M. BREWSTER, OF CHICAGO, ILLINOIS.

SHOCK ABSORBER.

Application filed May 4, 1925. Serial No. 27,625.

*To all whom it may concern:*

Be it known that I, HERBERT M. BREWSTER, a citizen of the United States, residing at Chicago, in the county of Cook and State of Illinois, have invented certain new and useful Improvements in Shock Absorbers, of which the following is a specification.

My invention relates to shock-absorbers of the general type employed on automobiles to coact with the usual leaf supporting springs to give the vehicle easy riding qualities.

In other words, the shock-absorber is auxiliary to and co-operates with the customary spring suspension means, whereby the road shocks are in large measure eliminated or dissipated, so that they do not reach the body of the vehicle and its occupants.

One object of the invention is the provision of a concussion or impact absorbing or assimilating means of the kind specified which is simple in structure, economical to manufacture, and efficient in service, permitting the ordinary springs to respond properly but limiting or restricting their recoiling action.

To this end, the preferred embodiment of the invention has two rubber or other resilient cushions of different compressive capacities, one of which is brought into action when the chassis or frame of the vehicle descends, as when the wheel drops into a depression in the roadway, the other being called to perform its restraining or cushioning function when the spring of the automobile tends to rebound or recoil excessively.

Accordingly, my present invention pertains to features of novelty and advantage, both structurally and functionally, in an improved type and style of shock-absorber or cushioning appliance, especially, though not restrictedly, adapted for beneficial employment on automobiles and other vehicles.

I have found that rubber, or an equivalent material, lends itself admirably for this purpose, and that it has distinct advantages over constructions employing members bearing frictionally upon one another, or those appliances using a liquid such as oil.

This is apparently due to the fact that rubber is, so to speak, alive, and responds quickly to compression and returns actively to its original condition after having been deformed or compressed by reason of the shocks it is designed to absorb or dissipate.

According to the principles of this invention, a rubber or equivalent cushion is subjected to compression or deformation when the chassis of the automobile descends relatively to the axle by reason of the bending or distortion of the load-supporting springs due to road shocks and inequalities, but it is the excessive rebound or recoil action of the springs which it is desirable to prevent or absorb, and, accordingly, in the preferred embodiment of this invention, such movement of the chassis is retarded or cushioned by reason of a stronger rubber or similar cushion so that the objectionable and destructive rebound is absorbed or satisfactorily overcome by the opposing resiliency or cushion effect of such block of rubber.

In such embodiment of the invention, the part of the member which acts on such opposed rubber cushions, has a movement only partly as great as that of the vehicle chassis with relation to the axle to render it more readily adaptable and suitable for compressive or temporary deforming action on the rubber block or blocks.

In order that those trained in this art may have a full and complete understanding of this invention and its various advantages, such preferred embodiment of the same has been illustrated in the accompanying drawing, forming a part of this specification and to which reference should be had in connection with the following detailed description, the same parts being supplied with like reference characters throughout the several views.

In this drawing:

Figure 1 is a fragmentary view of a portion only of an automobile showing the new appliance associated therewith;

Figure 2 is a vertical section through the cushion portion of the shock-absorber on line 2—2 of Figure 3, the parts being shown on an enlarged scale; and Figure 3 is a horizontal section on line 3—3 of Figure 2.

Referring to these several views of the drawing, it will be seen that the frame or chassis of the automobile is designated 11 and the front axle thereof has been supplied with the reference numeral 12, the remainder of the vehicle not being illustrated because it is of the usual construction and the parts shown are sufficient to indicate the manner of mounting the new and improved shock-absorber thereon.

The frame member 11 is of channel form in cross-section and between its upper and lower marginal flanges, usually disposed inwardly, I provide a central, apertured block 13, rectangular in shape, to conform to the space between the flanges, the hole through the block having the reference numeral 14.

A round disc 15 bears against the exposed face of the block and it has a central hole 16 therethrough in register with, and the same size as, the aperture 14.

To prevent this disc element from turning, it is equipped with a pair of dowel pins 17, 17 accommodated in aligned holes in the block 13, the latter being held from turning by its engagement with the upper and lower flanges of the frame bar 11, as will be readily understood.

On its exposed face, this circular member 15, has an integral, forwardly-projecting, rectangular, horizontal lug or abutment 18, as is indicated in Figures 2 and 3.

A bolt 19 having an enlarged head, an enlarged cylindrical part 22 and a nut 23 extends through the holes 14 and 16 with its shoulder 24 bearing against the surface of the part 15, thus securely holding the elements 13 and 15 fixedly and rigidly in position and securely against dislodgment, the nut bearing against the opposite face of the web of the channel frame-bar.

The hollow hub 25 of a round shell member is oscillatory on the part 22 of the bolt, such hub extending inwardly from and desirably integral with the round, disc section 26, of substanitally the same diameter as the element 15, the annular margin or border of the part 26 having an inwardly-extended, externally-ribbed, cylindrical, shell portion or flange 27 of virtually the same width as the length of the enlarged part of the bolt, which is practically the same as the corresponding dimension of the stop or abutment 18, whereby the complete part 27 acts as a cover or shield for the several members which it houses.

A second abutment 28, positioned 180° from the stop 18, forms an integral part of the casting 25—26—27 and is of substantially the same size and shape as its complementary member 18.

A practically semi-circular or arcuate rubber cushion 29 is housed inside of the casing or shell 27 above the two co-operating parts 18 and 28, the former of which is stationary and the latter of which is capable of slight rotary movement by reason of the oscillatory mounting of the hub on the central stationary bolt.

Obviously, if the wall 28 moves upwardly, the cushion will be compressed between such wall and the companion wall 18, the two, flat ends of the cushion bearing on these two members.

To give the cushion proper compressive capacity, it has a number of apertures 31 therethrough or cavities therein.

Below these two walls, and also housed in the casing, I employ a second, inverted, aperture, semi-circular, rubber cushion 32 with its opposite ends in engagement with the bottom faces of such coacting walls, the holes, apertures or cavities 33 in such cushion being either more numerous or larger than those of the upper cushion to give the lower one greater compressive properties to render its resilient characteristics more easily or readily available.

A horizontal arm 34 of appropriate length forms an integral part of the casting 25—26—27—28 and, by means of a link 35, it is pivotally connected to a bracket 36 bolted or otherwise fastened to the axle 12 of the automobile, whereby when the frame member 11 approaches the axle, the wall 28 will be rocked downwardly, and when such frame member recedes from the axle, the wall will be turned upwardly.

Obviously, therefore, if the front wheels of the automobile equipped with this new appliance drop into a depression in the roadway, the frame and its load naturally descend also, flexing the usual leaf springs of the vehicle, but this action is advantageously cushioned or resisted by the compression of the more readily deformable or condensible rubber cushion 32 between the fixed wall 18 and the movable co-operating wall 28.

Thus the springs and such lower cushion coact to soften the shock or impact in the manner specified.

When the springs attempt to rebound or recoil beyond their normal load-carrying position, the upward travel of the wall 28 compresses the corresponding stiffer or less resilient cushion 29, thus satisfactorily checking or retarding the rebound.

If desired, either one or both of the cushions may be under a normal moderate degree of compression under ordinary operating conditions.

The new shock-absorber may be employed with either or both, the front and rear axles, and may be mounted, as occasion or convenience dictates, either in front of or to the rear of such axles.

Inasmuch as the blocks 13 of different sizes are readily interchangeable for various sizes and shapes of frame members, the same shock-absorber may be used on practically all makes of automobiles by merely employing the correct blocks.

In Figure 3 particularly, the bolt 22 has been shown with a right-angle passage or conduit 37 adapted for association with any desirable lubricating means (not shown)

whereby the contacting surfaces of the bolt and hub may be adequately and properly supplied with a friction-reducing medium, such as oil or grease.

From the above description of the construction and mode of operation of this appliance, it will be seen that the shock-absorber includes two, opposed rubber or similar cushions of different capacitites whereby to effectively and efficiently and smoothy overcome the tendency to excessive spring reaction or recoil, but nevertheless permitting the springs to resiliently support the load and give the car as a whole smooth and easy qualities.

The invention is not limited and restricted to the precise and exact details of structure herein set forth and many minor mechanical changes may be made therein by those skilled in the art without departure from the heart and essence of the invention and without the sacrifice of any of its substantial benefits and advantages.

I claim:

1. A shock-absorber comprising in combination, an apertured block designed for application to the frame of a vehicle, a disc apertured in register therewith, a dowel-pin connection means between said disc and block to prevent turning of the disc relative to the block, an abutment rigid with and outstanding from said disc, a bolt holding said disc to said block, a shell member having a hub oscillatory on that part of the bolt outwardly beyond said disc, an abutment on and movable with said shell member, resilient cushions between opposite faces of said shell abutment and said disc abutment, said cushions being of different compressive capacities, and means to connect said shell member to an axle of the vehicle to turn such member when said frame and axle change relative positions.

2. A shock-absorber comprising in combination a disc having an abutment rigid and outstanding therefrom, means to mount said disc on the frame of a vehicle, a shell member oscillatory with respect to said disc and having an abutment on and movable therewith, resilient cushions between opposite sides of said shell abutment and said disc abutment, said cushions being of different compressive capacities, and means to connect said shell member to the axle of a vehicle to turn such member when said frame and axle change relative positions.

3. A shock-absorber comprising in combination, an oscillatory shell, means to mount said shell on the frame of a vehicle with capacity for rocking movement, means to connect said shell to an axle of the vehicle, an abutment inside of said shell adapted to be rigidly mounted on said frame, an abutment inside of and movable with said shell, a pair of resilient cushions in said shell between opposite faces of said movable abutment and said fixed abutment.

4. A shock-absorber comprising in combination, an oscillatory shell, means to mount said shell on the frame of a vehicle with capacity for rocking movement, means to connect said shell to an axle of the vehicle, an abutment inside of said shell adapted to be rigidly mounted on said frame, an abutment inside of and movable with said shell, a pair of resilient cushions of different compressive capacities in said shell between opposite faces of said movable abutment and said fixed abutment.

5. A shock-absorber comprising in combination, a round shell having an arm rigid therewith, a link connecting said arm to an axle of a vehicle, means to mount said shell on the frame of the vehicle with capacity for rocking movement around its own axis, an abutment inside of said shell adapted to be rigidly mounted on said frame, an abutment inside of and movable with said shell, and a pair of apertured resilient rubber cushions in said shell between opposite faces of said movable abutment and said fixed abutment.

6. A shock-absorber comprising in combination, a round shell having an arm rigid therewith, a link connecting said arm to an axle of a vehicle, means to mount said shell on the frame of the vehicle with capacity for rocking movement around its own axis, an abutment inside of said shell adapted to be rigidly mounted on said frame, an abutment inside of and movable with said shell, and a pair of apertured resilient rubber cushions of different compressive capacities in said shell between opposite faces of said movable abutment and said fixed abutment.

In witness whereof I have hereunto set my hand and seal.

HERBERT M. BREWSTER. [L. S.]